United States Patent [19]
Lai et al.

[11] Patent Number: 5,451,617
[45] Date of Patent: Sep. 19, 1995

[54] WETTABLE SILICONE HYDROGEL COMPOSITIONS AND METHODS FOR THEIR MANUFACTURE

[75] Inventors: Yu-Chan Lai; Paul J. Valint, Jr., both of Pittsford, N.Y.

[73] Assignee: Bausch & Lomb Incorporated, Rochester, N.Y.

[21] Appl. No.: 145,847

[22] Filed: Nov. 2, 1993

Related U.S. Application Data

[63] Continuation of Ser. No. 922,278, Jul. 30, 1992, abandoned, which is a continuation of Ser. No. 758,647, Sep. 12, 1991, abandoned.

[51] Int. Cl.$^6$ .................. C08F 230/08; C08G 77/00
[52] U.S. Cl. .................................. 523/107; 526/279
[58] Field of Search .................... 523/103; 526/279

[56] References Cited

U.S. PATENT DOCUMENTS

| | | | |
|---|---|---|---|
| 3,929,741 | 12/1975 | Laskey | 526/307.1 |
| 4,153,641 | 5/1979 | Deichert | 260/827 |
| 4,163,609 | 7/1979 | Neefe | 351/160 |
| 4,168,112 | 9/1979 | Ellis et al. | 427/164 |
| 4,192,627 | 3/1980 | Mueller et al. | 525/123 |
| 4,192,827 | 3/1980 | Mueller | 525/123 |
| 4,224,427 | 9/1980 | Mueller | 526/93 |
| 4,228,056 | 10/1980 | Stoy | 260/29.6 |
| 4,259,467 | 3/1981 | Keogh | 526/279 |
| 4,261,875 | 4/1981 | LeBoeuf | 260/29.7 |
| 4,267,295 | 5/1981 | Gallop | 526/264 |
| 4,273,734 | 6/1981 | Seiderman | 264/1.1 |
| 4,277,582 | 7/1981 | Mueller | 525/421 |
| 4,294,974 | 10/1981 | LeBoeuf | 556/440 |
| 4,300,820 | 11/1981 | Shah | 351/160 |
| 4,312,725 | 1/1982 | Loshaek | 204/159.22 |
| 4,355,147 | 10/1982 | Deichert | 526/264 |
| 4,369,229 | 1/1983 | Shah | 428/421 |
| 4,379,864 | 4/1983 | Gallop | 523/106 |
| 4,408,845 | 10/1983 | Seiderman | 351/160 |
| 4,414,375 | 11/1983 | Neefe | 526/260 |
| 4,462,665 | 7/1984 | Shah | 351/160 |
| 4,495,361 | 1/1985 | Friends | 556/419 |
| 4,543,371 | 9/1985 | Gallop | 523/106 |
| 4,543,398 | 9/1985 | Bany et al. | 525/474 |
| 4,548,983 | 10/1985 | Yokota | 524/726 |
| 4,605,712 | 8/1986 | Mueller et al. | 525/474 |
| 4,740,533 | 4/1988 | Su et al. | 523/106 |
| 4,743,106 | 5/1988 | Novicky | 351/160 |
| 4,748,224 | 5/1988 | Novicky | 526/242 |
| 4,810,764 | 3/1989 | Friends | 526/245 |
| 4,837,289 | 6/1989 | Mueller et al. | 526/279 |
| 4,861,850 | 8/1989 | Novicky | 526/243 |
| 4,882,403 | 11/1989 | Itoh | 526/245 |
| 4,921,497 | 5/1990 | Sulc | 623/6 |
| 4,929,250 | 5/1990 | Hung | 8/507 |
| 4,954,586 | 9/1990 | Toyoshima | 526/245 |
| 4,954,587 | 9/1990 | Mueller | 526/245 |
| 4,959,074 | 9/1990 | Halpern | 623/66 |
| 5,034,461 | 7/1991 | Lai et al. | 525/100 |
| 5,258,490 | 11/1993 | Chany | 523/103 |

FOREIGN PATENT DOCUMENTS 3203655  1/1985  Germany ................. G02B 1/04

*Primary Examiner*—Peter F. Kulkosky
*Attorney, Agent, or Firm*—Denis A. Polyn; Salvatore P. Pace; David M. Krasnow

[57] ABSTRACT

Improved silicone-containing hydrogels with enhanced wettability comprising at least one silicone-containing prepolymer, and an equimolar amphoteric mixture of acid-containing comonomers and amine-containing comonomers are herein disclosed.

30 Claims, No Drawings

WETTABLE SILICONE HYDROGEL COMPOSITIONS AND METHODS FOR THEIR MANUFACTURE

This is a continuation of copending application Ser. No. 07/922,278 filed on Jul. 30, 1992, now abandoned, which is a continuation of Ser. No. 07/758,647 filed on Sep. 12, 1991, which is now abandoned.

BACKGROUND OF THE INVENTION

1. Field of the Invention

The present invention relates to improved polymeric silicone-containing hydrogel compositions useful for the production of biomedical devices, especially contact lenses.

2. Background

Hydrogels have been a desirable material for the preparation of biomedical devices, and have been known since at least Wichterle, et al U.S. Pat. No. 3,220,960 which disclosed hydrogels comprising a hydrated polymer of a hydroxyalkyl acrylate or methacrylate crosslinked with a corresponding diester (poly 2-hydroxyethyl methacrylate, known as HEMA).

A hydrogel is a hydrated crosslinked polymeric system that contains water in an equilibrium state. The physical properties of hydrogels can vary widely and are mostly determined by their water content. Since hydrogels exhibit excellent biocompatibility, there has been extensive interest in the use of hydrogels for biomedical devices, especially contact lenses.

In the field of contact lenses, various factors combine to yield a material that has appropriate characteristics. Oxygen permeability, wettability, material strength and stability are but a few of the factors which must be carefully balanced to achieve a useable end-result contact lens. Since the cornea receives its oxygen supply exclusively from contact with the atmosphere, good oxygen permeability is a critical characteristic for any contact lens material.

It was discovered in the field that certain crosslinked polymeric materials could be hydrated and retain their water content. It was further found that the higher the water content within contact lenses made from these crosslinked hydrogel polymers, the greater was the oxygen permeability through the lens to the cornea.

High water-containing hydrogels have at times exhibited undesirable mechanical properties. For example, such hydrogels are not easily formed into hydrolytically stable lenses. Further such materials have at times exhibited tearing or other breakage as a result of poor tensile strength. What was needed was a highly oxygen permeable material that was durable and highly wettable. Wettability is important in that if the lens is not sufficiently wettable, it does not remain lubricated and therefore cannot be worn comfortably on the eye. The optimal contact lens would have not only excellent oxygen permeability, but also excellent tear fluid wettability.

Silicone-containing materials were tried as viable contact lens materials and displayed very good oxygen permeability and durability. However, most silicone-containing materials are largely hydrophobic and therefore not sufficiently wettable. Further, it is believed that such hydrophobicity may cause deposit problems, which may result in discomfort when wearing contact lenses made from these silicone-containing polymers.

Therefore, an optimal hydrogel material for biomedical devices, such as contact lenses, would have ideal rigidity, high oxygen permeability and a high degree of wettability.

SUMMARY OF THE INVENTION

In accordance with the present invention, the surface wettability of hydrogels such as silicone-containing hydrogels, and more specifically urethane-containing prepolymeric hydrogels and ethylenically terminated polysiloxane hydrogels, can be significantly enhanced by the addition of an amphoteric equimolar mixture of acid-containing and amine-containing comonomers in the monomer mix. It is believed that such an amphoteric comonomer mixture reacts with the predominantly hydrophobic silicone-containing monomers and prepolymers to produce highly wettable hydrogels.

Further, in accordance with the instant invention, a method for making a wettable silicone-containing hydrogel composition is disclosed comprising the steps of a) combining an amphoteric equimolar mixture of acid-containing and amine-containing comonomers and at least one silicone-containing prepolymer into a monomer mix and b) curing the monomer mix resulting from step a) to form a silicone-containing hydrogel composition.

DETAILED DESCRIPTION OF THE INVENTION

The present invention relates to methods for improving the wettability of hydrogels, especially silicone-containing hydrogels having ideal rigidity suitable for biomedical applications such as contact lenses.

The silicone-containing hydrogels of the present invention display improved wettability as a result of the presence of an amphoteric equimolar mixture of acid-containing and amine-containing comonomers in the monomer mix with the silicone-containing monomer or prepolymer.

Silicone hydrogels (i.e., hydrogels containing silicone) are usually prepared by polymerizing a mixture containing at least one silicone-containing monomer and at least one hydrophilic monomer. Either the silicone-containing monomer or the hydrophilic monomer may function as a crosslinking agent (a crosslinker being defined as a monomer having multiple polymerizable fuctionalities) or a separate crosslinker may be employed.

Any known silicone-containing prepolymer may be used in the process of this invention to form the silicone hydrogels of this invention, as will be apparent to one skilled in the art. The monomers added to the monomer mix to create the monomeric mixture may be monomers or prepolymers. A "prepolymer" is a reaction intermediate polymer of medium molecular weight having polymerizable groups. Thus it is understood that the terms "silicone-containing monomers" and "hydrophilic monomers" include prepolymers. Examples of such monomers may be found in U.S. Pat. Nos. 4,136,250; 4,153,641; 4,740,533; 5,034,461; and 5,070,215.

Additional crosslinking agents which may be incorporated into the silicone-containing hydrogel of the present invention include polyvinyl, typically dior trivinyl monomers, most commonly the di- or tri(meth)acrylates of dihydric ethylene glycol, triethylene glycol, butylene glycol, hexane-1,6-diol, thio-diethylene glycol-diacrylate and methacrylate; neopentyl glycol diacrylate; trimethylolpropane triacrylate and the like; N,N'-dihydroxyethylenebisacrylamide and -bismethacrylamides; also diallyl compounds like diallyl phthalate and triallyl cyanurate; divinylbenzene; ethylene glycol divinyl ether; and the (meth)acrylate esters of polyols such as triethanolamine, glycerol, pentanerythritol, butylene glycol, mannitol, and sorbitol. Further, illustrations include N,N-methylene-bis-(meth)acrylamide, sulfonated divinylbenzene, and divinylsulfone. Also useful are the reaction products of hydroxyalkyl (meth)acrylates with unsaturated isocyanates, for example the reaction product of 2-hydroxyethyl methacrylate with 2-isocyanatoethyl methacrylate (IEM) as disclosed in U.S. Pat. No. 4,954,587.

Other known crosslinking agents are polyether-bisurethane-dimethacrylates as described in U.S. Pat. No. 4,192,827, and those crosslinkers obtained by reaction of polyethylene glycol, polypropylene glycol and polytetramethylene glycol with 2-isocyanatoethyl methacrylate (IEM) or m-isopropenyl- $\gamma$, $\gamma$,-dimethylbenzyl isocyanates (m-TMI), and polysiloxane-bisurethane-dimethacrylates as described in U.S. Pat. Nos. 4,486,577 and 4,605,712. Still other known crosslinking agents are the reaction products of polyvinyl alcohol, ethoxylated polyvinyl alcohol or of polyvinyl alcohol-co-ethylene with 0.1 to 10 mol % vinyl isocyanates like IEM or m-TMI.

One preferred class of suitable silicone-containing prepolymers contemplated by the present invention are bulky polysiloxanylalkyl (meth)acrylic monomers represented by the formula (I):

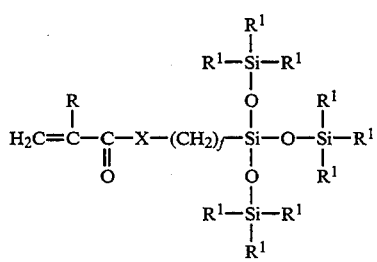
(I)

wherein:
X is O or NR;
each R is independently hydrogen or methyl; and
each $R^1$ is independently a lower alkyl or phenyl group; and
f is 1 or 3 to 10.

Such bulky monomers include methacryloxypropyl tris(trimethylsiloxy)silane, pentamethyldisiloxanylmethylmethacrylate, tris(trimethylsiloxy)methacryloxy propylsilane, phenyltetramethyldisiloxanylethyl acrylate, and methyldi(trimethylsiloxy)methacryloxymethyl silane.

A further preferred class of silicone-containing prepolymer is a poly(organosiloxane) prepolymer represented by the formula (II):

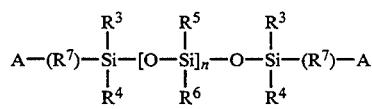
(II)

wherein:
A is an activated unsaturated group, such as an ester or amide of an acrylic or a methacrylic acid;

each $R^3$-$R^6$ is independently selected from the group consisting of a monovalent hydrocarbon radical or a halogen substituted monovalent hydrocarbon radical having 1 to 18 carbon atoms which may have ether linkages between carbon atoms;
$R^7$ is a divalent hydrocarbon radical having from 1 to 22 carbon atoms; and
n is 0 or an integer greater than or equal to 1.

A further preferred class of silicone-containing prepolymers are the monomers having the following schematic representations:

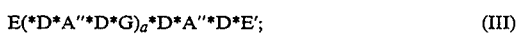
(III)

or

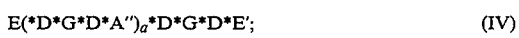
(IV)

where
D denotes an alkyl diradical, an alkyl cyctoalkyl diradical, a cycloalkyl diradical, an aryl diradical or an alkylaryl diradical having 6 to 30 carbon atoms;
G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
* denotes a urethane or ureido linkage;
a is at least 1;
A" denotes a divalent polymeric radical of formula (V):

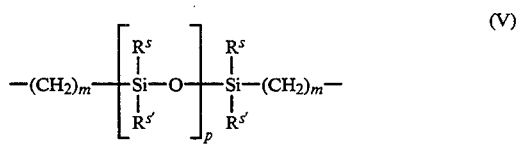
(V)

wherein: $R^s$ and $R^{s'}$ independently denote an alkyl or fluoro-substituted alkyl group having 1 to 10 carbon atoms which may contain ether linkages between carbon atoms;
m is at least 1; and
p provides a moiety weight of 400 to 10,000;
E and E' independently denote a polymerizable unsaturated organic radical represented by formula (VI):

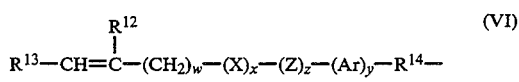
(VI)

wherein: $R^{14}$ denotes a divalent alkylene radical having 1 to 10 carbon atoms;
$R^{12}$ denotes H or $CH_3$;
$R^{13}$ denotes H, a ($C_1$-$C_6$) alkyl radical or a —CO—Y—$R^{15}$ group wherein Y is —O—, —S— or —NH— and $R^{15}$ is a alkyl radical having 1 to 12 carbon atoms;
X is —CO— or —OCO—;
Z is —O— or —NH—;
Ar denotes an aromatic radical having 6 to 30 carbon atoms;
w is 0 to 6;
x is 0 or 1;
y is 0 or 1; and
z is 0 or 1.

A preferred urethane prepolymer is represented by formula (VII):

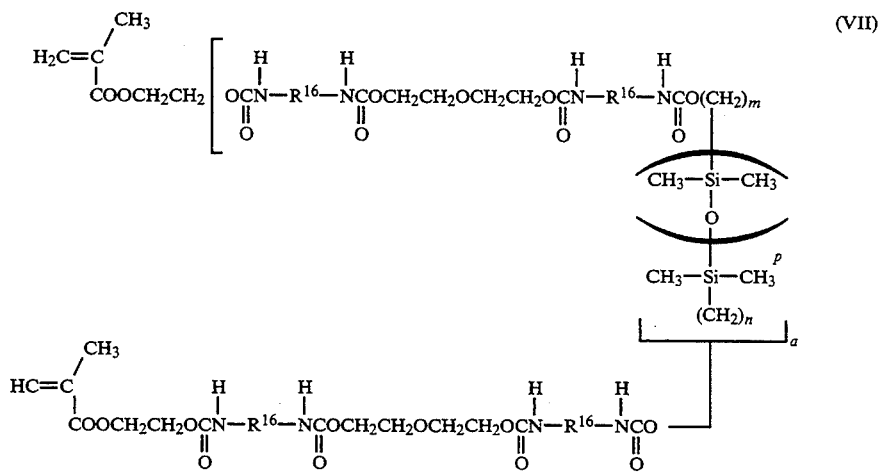

wherein:

$R^{16}$ is a diradical of a diisocyanate after removal of the isocyanate group, and is most preferably the diradical of isophorone diisocyanate, and m, p and a are the same as previously defined. Preferably, the sum of m and a is 3 or 4, and more preferably, a is 1 and m is 3 or 4. Preferably, p is at least 30.

The monomer mixes employed in this invention, can be readily cured to cast shapes by conventional methods such as UV polymerization, or thermal polymerization, or combinations thereof, as commonly used in polymerizing ethylenically unsaturated compounds. Representative free radical thermal polymerization initiators are organic peroxides, such as acetal peroxide, lauroyl peroxide, decanoyl peroxide, stearoyl peroxide, benzoyl peroxide. tertiarybutyl peroxypivalate, peroxydicarbonate, and the like, employed in a concentration of about 0.01 to 1 percent by weight of the total monomer mixture. Representative UV initiators are those known in the field such as, benzoin methyl ether, benzoin ethyl ether, Darocure 1173, 1164, 2273, 1116, 2959, 3331 (EM Industries) and Igracure 651 and 184 (Ciba-Geigy).

Polymerization of the monomer mix of this invention may be performed in the presence of a diluent. The polymerization product will then be in the form of a gel. If the diluent is nonaqueous, the diluent must be removed from the gel and replaced with water through the use of extraction and hydration protocols well known to those skilled in the art.

It is also possible to perform the polymerization in the absence of diluent to produce a xerogel. These xerogels may then be hydrated to form the hydrogels as is well known in the art.

In addition to the above-mentioned polymerization initiators, the copolymer of the present invention may also include other monomers as will be apparent to one skilled in the art. For example, the monomer mix may include additional hydrophilic monomers such as N-vinyl pyrrolidone and N,N-dimethyl acrylamide, colorants, or UV-absorbing and toughening agents such as those known in the contact lens art.

The polymers of this invention can be formed into contact lenses by spincasting processes (such as those disclosed in U.S. Pat. Nos. 3,408,429 and 3,496,254), cast molding processes (U.S. Pat Nos. 4,084,459 and 4,197,266), combinations of methods thereof, or any other known method for making contact lenses. Polymerization may be conducted either in a spinning mold, or a stationary mold corresponding to a desired contact lens shape. The lens may be further subjected to mechanical finishing, as occasion demands. Polymerization may also be conducted in an appropriate mold or vessel to form buttons, plates or rods, which may then be processed (e.g., cut or polished via lathe or laser) to give a contact lens having a desired shape.

The hydrogels the present invention are oxygen transporting, hydrolytically stable, biologically inert, and transparent. The monomers and prepolymers employed in accordance with this invention, are readily polymerized to form three dimensional networks which permit the transport of oxygen and are optically clear, strong and hydrophilic.

The relative softness or hardness of the contact lenses fabricated from the resulting polymer of this invention can be varied by deceasing or increasing the molecular weight of the polysiloxane prepolymer end-capped with the activated unsaturated group or by varying the percent of the comonomer. As the ratio of polysiloxane units to end-cap units increases, the softness of the material increases.

The resulting polymers and copolymers disclosed herein can be boiled and/or autoclaved in water without being damaged whereby sterilization may be achieved. Thus, an article formed from the disclosed polymers and copolymers may be used, for example, in surgery where an article is needed which is compatible with living tissue or with the mucous membranes.

It is contemplated that the wettable silicone-containing hydrogels of the present invention, when used in contact lens applications, can produce a wide variety of types of hydrogel contact lenses. As is understood in the field, in general, hydrogel contact lenses should have oxygen permeabilities with DK values greater than $20 \times 10^{-11}$ cm$^3 \times$cm/sec$\times$cm$^2 \times$mmHg (or DK units) and preferably greater than 60 DK. They should have a Young's modulus of elasticity in the range of 5 to 400 g/mm$^2$, preferably greater than 20 g/mm$^2$ and as measured by ASTM test method D 1938. Their water content should be between 10 to 80%, and preferably between 20 to 60%. The contact angle, which is a measurement of the wettability of the lens, should be less than 80 degrees and should preferably be less than 40 degrees.

The present invention further provides articles of manufacture which can be used for biomedical devices, such as, contact lenses, surgical devices, heart valves, vessel substitutes, intrauterine devices, membranes and other films, diaphragms, catheters, mouth guards, denture liners, intraocular devices, and especially contact lenses.

The terms "shaped articles for use in biomedical applications" or "biomedical devices" mean the materials disclosed herein have physicochemical properties rendering them suitable for prolonged contact with living tissue, blood and the mucous membranes.

The present invention contemplates the use of a wide variety of acids and bases (amines) in combination for the purpose of deriving the herein disclosed equimolar amphoteric mix as would be appreciated by those skilled in the field. Further, the preferred acids and bases to be used in accordance with the present invention are those which complement reaction with a variety of hydrogels, preferably silicone-containing hydrogel polymers and prepolymers.

As was mentioned previously, an equimolar amount of base-containing monomers (which accept protons) and acid-containing monomers (which supply protons) are provided in an amphoteric mix to the hydrogel polymer or prepolymer. The term "amphoteric" is understood to denote a compound or mixture of compounds exhibiting both acid and basic properties due to the inclusion of both an acid and a base (amine) functionality within its structure. The presence of two functional groups on these aforementioned amphoteric compounds results in a reduction by one-half of the molar amount needed to be supplied to the reaction, as compared with conventional monofunctional wetting agent used, such as methacrylic acid. This is important because the hydrogel characteristics are drastically affected by even small increases in molar amounts of substituents used in the polymeric mix. For example, while a concentration of acid exceeding 10 weight percent might be desirable from a wettability standpoint, such a concentration may adversely affect other properties of the resulting hydrogel. The resulting polymeric film may have undesirable optical characteristics such as cloudiness, etc. When amphoteric hydrophilic groups are used, only half the weight percent of the amount of monofunctional hydrophilic groups need be used to obtain a comparable effect on the polymeric mixture.

Further, notations such as "(meth)acrylate or "(meth)acrylamide" are used herein to denote optional methyl substitution. Thus, for example, methyl (meth)acrylate includes both methyl acrylate and methyl methacrylate and N-alkyl (meth)acrylamide includes both N-alkyl acrylamide and N-alkyl methacrylamide.

The preferred range of the equimolar acid- and amine-containing monomer mix concentration is about from 0.5 weight percent of the polymeric hydrogel mix to about 10 weight percent, and more preferably from about 2 weight percent to about 5 weight percent.

The resulting hydrogels show great promise as a superior material for various biomedical devices such as surgical implants, blood vessels, artificial ureters, artificial breast tissue and membranes intended to come into contact with body fluid outside of the body, e.g., membranes for kidney dialysis and heart/lung machines and the like. It is known that blood, for example, is readily and rapidly damaged when it comes into contact with artificial surfaces. The design of a synthetic surface which is antithrombogenic and nonhemolytic to blood is necessary for prostheses and devices used with blood.

Two preferred classes of silicone-containing monomers contemplated by the present invention are urethane-containing prepolymers, and ethylenically terminated polysiloxane-containing monomers, such as, most preferably $\gamma, \omega$-bis(methacryloxybutyl)polysiloxane ($M_2D_{25}$).

The preferred acid-containing comonomers of the amphoteric monomer mixture are methacrylic acid, 3-methacryl-$\beta$-alanine, 3-acryl-$\beta$-alanine, $\alpha$-methacrylamidoalkanoic acid, 2-acrylamido-2-methylpropane sulfonic acid, acrylic acid, itaconic acid, and maleic acid, with 2-acrylamido-2-methylpropane sulfonic acid and methacrylic acid being more preferred.

The preferred amine-containing comonomers of the amphoteric monomer mixture are 3-(N,N-dimethylamino)propyl methacrylamide, and 2-(N,N-dimethylamino)ethyl methacrylate, with 3-(N,N-dimethylamino)propyl methacrylamide being the most preferred.

Further, although the exact mechanisms are not fully understood at the present time, the hydrophilic amphoteric equimolar mixtures of acid- and amine-containing comonomers of the present invention significantly reduce the contact angle of the surface—a clear indication to those skilled in the field that enhanced wetting has occurred. The resulting treated hydrogels were unexpectedly hydrolytically stable, within an acceptable range. The resulting hydrogels also appear to collect only an acceptable level of protein deposits.

The resulting polymers and copolymers disclosed herein can be boiled and/or autoclaved in water without being damaged whereby sterilization may be achieved. Thus, an article formed from the disclosed polymers and copolymers may be used, for example, in surgery where an article is needed which is compatible with living tissue or with the mucous membranes.

The following examples serve only to further illustrate aspects of the present invention and should not be construed as limiting the invention.

EXAMPLE 1

Preparation of polyurethane Monomer Mix (Control)

A formulation containing the following was prepared: urethane prepolymer derived from isophorone diisocyanate, diethylene glycol, polysiloxanediol of molecular weight 3000 and 2-hydroxyethyl methacrylate, 35 parts; 3-methacryloxypropyl tris(trimethylsiloxy)silane, (TRIS), 35 parts; N,N-dimethyl acrylamide, 30 parts; n-hexanol, 40 parts; benzoin methyl ether, 0.2 part. The resulting clear mix was then UV cured into films or filtered through a 1.2 micron filter into a clean glass vial ready for lens casting.

EXAMPLE 2

Preparation of Polyurethane Monomer Mix with Amphoteric Mixtures

Polyurethane monomer mix was prepared as in Example 1 with the addition of 2 parts amphoteric pair monomer mix. This amphoteric mix is comprised of equimolar acid-containing monomer and an amine-containing monomer. The acid-containing monomer is 2-acrylamido-2-methyl propanesulfonic acid (AMPS). The amine-containing monomer is 3-(N,N-dimethylamino)propyl methacrylamide (DMAPMA).

EXAMPLE 3

Preparation of $M_2D_x$-Containing Mix

α, ω-Bis(methacryloxybutyl)polysiloxane ($M_2D_{25}$) prepared from the reaction of 1,3-bis(4-methacryloxybutyl) disiloxane and 1,1,3,3,5,5-hexamethyl trisiloxane in molar ratio of 1:8.33 was combined with TRIS, N,N-dimethyl acrylamide (DMA), a solvent (hexanol) and an initiator (Darocure-1173, EM Industries) in the following weight ratio:

| | |
|---|---|
| M2D25 | 13 |
| TRIS | 47 |
| DMA | 40 |
| n-hexanol | 40 |
| Darocure-1173 | 0.2 |

EXAMPLE 4

Preparation of $M_2D_x$ Amphoteric Monomer Mix

A monomer mixture was prepared by adding two parts of equal molar mixture of 2-acrylamido-2-methyl propanesulfonic acid (AMPS) and 3-(N,N-dimethylamino)propyl methacrylamide (DMAPMA) were added into the monomer mixture resulting from EXAMPLE 3.

EXAMPLE 5

Film Casting of Control and Amphoteric Polyurethanes

The resultant formulations from Examples 1 through 4 were placed between glass plates and cured under UV for 2 hours. After the films were released from the glass, they were extracted with ethanol for 16 hours and then boiled in water for 4 hours and placed in buffered saline at pH 7.4. The hydrogel films were then characterized for mechanical properties, oxygen permeability, contact angle and others.

EXAMPLE 6

Comparison of Properties

The following comparative properties of the control polyurethane and polyurethane films wetted with the amphoteric mixture were noted.

| Properties | Control | Amphoteric |
|---|---|---|
| Water content % | 24 | 26 |
| Oxygen perm. (Dk) | 100 | 120 |
| Modulus g/mm² | 100 | 85 |
| Tear strength | 15 | 12 |

The formulation containing the amphoteric monomer mixture gave higher water content and softer hydrogel films.

EXAMPLE 7

Hydrolytic Stability Testing

The cured films, after being extracted with solvent (ethanol) and dried in vacuo, were cut into disks weighing 30 mg with a thickness of 250 microns. They were weighed while dry and were then submerged into buffered saline at pH 7.4 in 12 vials and sealed. After equilibration, the films were then placed in an oven at 80 degrees C. Three vials were taken out after 3, 5, 7 and 14 days and the dry weight and water contents were determined gravimetrically. The hydrolytic stabilities were reported as % weight loss after 14 day testing. Low weight losses are most desirable. Experimentally, it was determined that resultant hydrogels having a weight loss of 7% or less would be considered stable. Polyurethane hydrogel films modified with two parts of methacrylic acid and 2 parts of amphoteric mix as described in Example 2 were compared.

| | Methacrylic Acid (MA) | Amphoteric |
|---|---|---|
| Hydrolytic 14 day wt.loss % | 11.5 | 2.9 |

EXAMPLE 8

Lysozyme Uptake Tests

The tests were accomplished by agitating hydrogel films of known weight, (usually 30-40 mg) in a vial containing a standard buffered saline (5 grams) with 500 ppm of lysozyme for a 7 day period. The amount of lysozyme remaining in the solution was determined by UV spectroscopy and the lysozyme uptake was reported as micrograms of lysozyme per milligram of hydrogel film, using poly(hydroxyethylmethacrylate) hydrogel films as references during the test. The lysozyme uptakes of the control hydrogel and those modified with an amphoteric mixture and methacrylic acid are listed below.

| | Control | Amphoteric | MA |
|---|---|---|---|
| Lysozyme Uptake | 5 | 9 | 24 |

The high level of lysozome uptake is not desirable in contact lenses. Such uptake decreases visual acuity and can result in other eye physiological side effects. While it is desirable to add ionic monomers into the silicone-containing hydrogel to improve wettability, the lysozome uptake level should remain at a low level. The amphoteric monomers contain an equimolar amount of acid and amine, and therefore bring no net charge to the resulting hydrogel lenses. It is believed that this results in causing low levels of lysozome uptake while the ionic nature of the amphoteric compounds nevertheless improve wettability of the silicone-containing hydrogels.

EXAMPLE 9

Contact Angle Measurement

The contact angles of the surface of the films prepared in Examples 1 and 2 were measured by the captive bubble technique. The films were submerged in buffered saline solution and a bubble of air was attached to the undersurface of the film. The angle made by the intersection of the lens and bubble surfaces was measured using a goniometer. A lower contact angle represents a greater degree of hydrophillicity or film surface wettability. The contact angles of the control hydrogel films and the films modified with 2 parts of amphoteric mix (Example 2) were compared.

| | Control | Amphoteric |
|---|---|---|
| Contact Angle | 38 | 18 |

EXAMPLE 10

Cast Moldings of Polyurethane Lenses

A polyurethane monomer mix of composition described in Examples 1 and 2 was filtered through a disposable filter of pore size 1.2 microns, into a clean vial. Through an applicator, under an inert atmosphere nitrogen, 60-90 μl of the mix was injected onto a clean plastic mold (for the anterior surface of a lens) and then covered with a second plastic mold (forming the posterior surface of the lens). The molds are then compressed and cured for 90 minutes in the presence of ultraviolet light (4200 microwatts). The molds were opened mechanically and put in a beaker containing aqueous ethanol. The lenses were released from the mold within 10 to 50 minutes. The lenses were then extracted with ethanol for 48 hours and boiled in distilled water for 4 hours and inspected for cosmetic quality and dimension. Lenses passing inspection were thermally disinfected in phosphate-buffered saline prior to on-eye evaluation.

EXAMPLE 11

Clinical Evaluations

The cast molded lenses described in Example 10 were evaluated on six subjects. In each case, poly(HEMA) lenses were worn in one eye and test lenses in the other eye. The lenses were analyzed after a minimum of one hour of wear, and optimally for 6 hours, for wettability and surface deposition. The wettability rating scale was 0-4 with 0 representing ⅔ of the anterior surface unwetted by the tear film and 4 representing complete wetting. The deposition scale was also 0-4 with 0 representing no surface deposit and 4 representing multiple deposits of 0.5 mm diameter or larger. The results for the lenses made from the control formulation according to Example 1 was 2.0 for wetting and 1.6 for deposit after 1 hour of wear. For lenses comprising 2 parts of amphoteric monomer mixture, the results showed a wettability rating of 3.0 and deposit rating of 1.0 after 6 hours of wear. The results indicate that lenses containing the amphoteric mixture have characteristics superior to the control lenses as well as heightened clinical acceptance.

Many other modifications and variations of the present invention are possible to the skilled practitioner in the field in light of the teachings herein. It is therefore understood that, within the scope of the claims, the present invention can be practiced other than as herein specifically described.

We claim:

1. In a method of making a silicone-containing hydrogel composition by:
   a) providing at least one hydrophilic monomer and at least one silicone-containing monomer to a monomer mix; and
   b) curing the monomer mix resulting from step a) to form a silicone-containing hydrogel composition the improvement of which comprises
   improving the wettability of the silicone-containing hydrogel composition, which is characterized by the composition having a contact angle of less than about 25 degrees, by providing from about 0.5 to about 10 weight percent of an amphoteric equimolar mixture of acid-containing and amine-containing comonomers different from the hydrophilic monomers of step a) to the monomer mix of step a).

2. The method of claim 1 wherein said silicone-containing monomer is a urethane-containing prepolymer.

3. The method of claim 1 wherein said silicone-containing monomer is an ethylenically terminated polysiloxane-containing prepolymer.

4. The method of claim 1 wherein said acid-containing comonomer is selected from the group consisting of methacrylic acid, 3-methacryl-β-alanine, 3-acryl-β-alanine, α-methacrylamidoalkanoic acid, 2-acrylamido-2-methylpropane sulfonic acid, acrylic acid, itaconic acid, maleic acid, and 2-acrylamido-2-methylpropane sulfonic acid.

5. The method of claim 1 wherein said amine-containing comonomer is selected from the group consisting of 3-(N,N-dimethylamino)propyl methacrylamide, and 2-(N,N-dimethylamino)ethyl methacrylate.

6. The method of claim 1 wherein said silicone-containing monomer is a poly(organosiloxane) prepolymer represented by the formula:

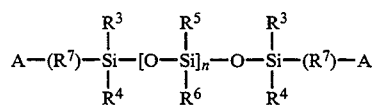

wherein:
A is an activated unsaturated group, such as an ester or amide of an acrylic or a methacrylic acid;
each $R^3$-$R^6$ is independently selected from the group consisting of a monovalent hydrocarbon radical or a halogen substituted monovalent hydrocarbon radical having 1 to 18 carbon atoms which may have ether linkages between carbon atoms;
$R^7$ is a divalent hydrocarbon radical having from 1 to 22 carbon atoms;
and
n is 0 or an integer greater than or equal to 1.

7. The method of claim 1 wherein the monomer mix additionally comprises a bulky polysiloxanylalkyl (meth)acrylic monomer having the formula:

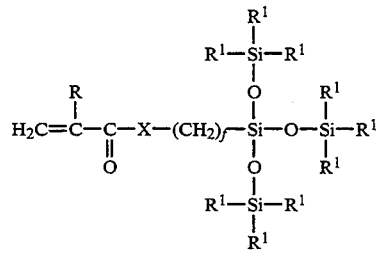

wherein:
X is O or NR;
each R is independently hydrogen or methyl; and
each $R^1$ is independently a lower alkyl or phenyl group; and
f is 1 or 3 to 10.

8. The method of claim 7 wherein said bulky polysiloxanyalkyl methacrylic monomer is selected from the group consisting of methacryloxypropyl tris(trimethylsiloxy)silane, pentamethyldisiloxanylmethylmethacrylate, tris(trimethylsiloxy)methacryloxy propylsilane, phenyltetramethyldisiloxanylethyl acrylate, and methyldi(trimethylsiloxy)methacryloxymethyl silane.

9. The method of claim 1 wherein said silicone-containing monomer is a urethane-containing prepolymer having the following schematic representations:

E(*D*A'''*D,G)$_a$*D*A'''*D*E'; or

E(*D*G*D*A'')$_a$*D*G*D*E'';

wherein
D denotes an alkyl diradical, an alkyl cycloalkyl diradical, a cycloalkyl diradical, an aryl diradical or an alkylaryl diradical having 6 to 30 carbon atoms;
G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;
* denotes a urethane or ureido linkage;
a is at least 1;
A denotes a divalent polymeric radical of formula:

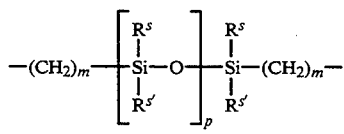

wherein: $R^s$ and $R'$ independently denote an alkyl or fluoro-substituted alkyl group having 1 to 10 carbon atoms which may contain ether linkages between carbon atoms;
m is at least 1; and
p provides a moiety weight of 400 to 10,000;
E and E' independently denote a polymerizable unsaturated organic radical represented by formula:

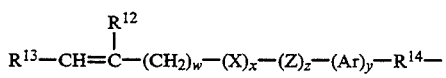

wherein:
$R^{14}$ denotes a divalent alkylene radical having 1 to 10 carbon atoms;
$R^{12}$ denotes H or $CH_3$;
$R^{13}$ denotes H, a ($C_1$-$C_6$) alkyl radical or a —CO—Y—$R^{15}$ group wherein Y is —O—, —S— or —NH— and $R^{15}$ is a alkyl radical having 1 to 12 carbon atoms;
X is —CO— or —OCO—;
Z is —O— or —NH—;
Ar denotes an aromatic radical having 6 to 30 carbon atoms;
w is 0 to 6;
x is 0 or 1;
y is 0 or 1; and
z is 0 or 1.

10. The method of claim 9 wherein said urethane-containing prepolymer is represented by formula:

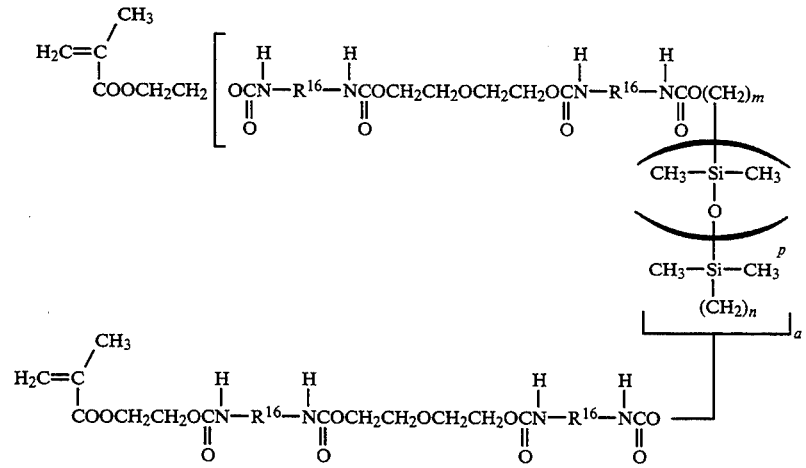

wherein:
$R^{16}$ is a diradical of a diisocyanate after removal of the isocyanate group and m, p and a are the same as previously defined.

11. The method of claim 1 wherein said monomer mix contains N,N-dimethylacrylamide.

12. The method of claim 1 wherein said amphoteric mixture is present in an amount of from about 2 weight percent to about 5 weight percent.

13. In an improved silicone-containing hydrogel composition formed by at least one hydrophilic monomer and at least one silicone-containing monomer incorporated into a monomer mix which is cured into a silicone-containing hydrogel composition, the improvement of which comprises:
improving the weltability of the silicone-containing hydrogel composition by having a contact angle of less than about 25 degrees by providing an amphoteric equimolar mixture of acid-containing and amine-containing comonomers different from the hydrophilic monomer in an amount of from about 0.5 to about 10 weight percent into the monomer mix.

14. The hydrogel of claim 13 wherein said silicone-containing monomer is a urethane-containing prepolymer.

15. The hydrogel of claim 13 wherein said silicone-containing prepolymer is an ethylenically terminated polysiloxane-containing prepolymer.

16. The hydrogel of claim 13 wherein acid-containing comonomer is selected from the group consisting of methacrylic acid, 3-methacryl-β-alanine, -acryl-β-alanine, α-methacrylamidoalkanoic acid, 2-acrylamido-2-methylpropane sulfonic acid, acrylic acid, itaconic acid, maleic acid, and 2-acrylamido-2-methylpropane sulfonic acid.

17. The hydrogel of claim 13 wherein said amine-containing comonomer is selected from the group consisting of 3-(N,N-dimethylamino)propyl methacrylamide, and 2-(N,N-dimethylamino)ethyl methacrylate.

18. The hydrogel of claim 13 wherein said silicone-containing monomer is a poly(organosiloxane) prepolymer represented by the formula:

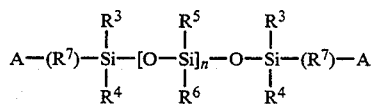

wherein:

A is an activated unsaturated group, such as an ester or amide of an acrylic or a methacrylic acid;

each $R^3$-$R^6$ is independently selected from the group consisting of a monovalent hydrocarbon radical or a halogen substituted monovalent hydrocarbon radical having 1 to 18 carbon atoms which may have ether linkages between carbon atoms;

$R^7$ is a divalent hydrocarbon radical having from 1 to 22 carbon atoms; and n is 0 or an integer greater than or equal to 1.

19. The method of claim 13 wherein the monomer mix additionally comprises a bulky polysiloxanylalkyl (meth)acrylic monomer having the formula:

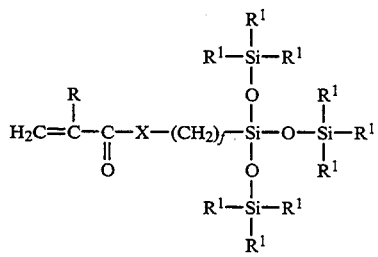

wherein:

X is O or NR;

each R is independently hydrogen or methyl; and each $R^1$ is independently a lower alkyl or phenyl group; and f is 1 or 3 to 10.

20. The hydrogel of claim 19 wherein said bulky polysiloxanyalkyl (meth)acrylate monomer is selected from the group consisting of methacryloxypropyl tris(trimethylsiloxy)silane, pentamethyldisiloxanylmethylmethacrylate, tris(trimethylsiloxy)methacryloxy propylsilane, phenyltetramethyldisiloxanylethyl acetate, and methyldi(trimethylsiloxy)methacryloxymethyl silane.

21. The hydrogel of claim 13 wherein said silicone-containing prepolymer is a urethane-containing prepolymer having the following schematic representations:

E(*D*A'''*D*G)$_a$*D*A'''*D*E'; or

E(*D*G*D*A'')$_a$*D*G*D*E';

wherein

D denotes an alkyl diradical, an alkyl cycloalkyl diradical, a cycloalkyl diradical, an aryl diradical or an alkylaryl diradical having 6 to 30 carbon atoms;

G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

a is at least 1;

A'' denotes a divalent polymeric radical of formula:

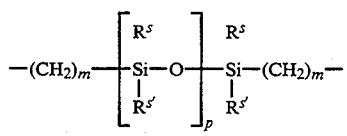

wherein: $R^s$ and $R^{s'}$ independently denote an alkyl or fluoro-substituted alkyl group having 1 to 10 carbon atoms which may contain ether linkages between carbon atoms;

m is at least 1; and p provides a moiety weight of 400 to 10,000;

E and E' independently denote a polymerizable unsaturated organic radical represented by formula:

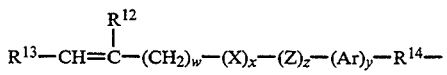

wherein: $R^{14}$ denotes a divalent alkylene radical having 1 to 10 carbon atoms;

$R^{12}$ denotes H or $CH_3$;

$R^{13}$ denotes H, a ($C_1$-$C_6$) alkyl radical or a —CO—Y—$R^{15}$ group wherein Y is —O—, —S— or —NH— and $R^{15}$ is a alkyl radical having 1 to 12 carbon atoms;

X is —CO— or —OCO—;

Z is —O— or —NH—;

Ar denotes an aromatic radical having 6 to 30 carbon atoms;

w is 0 to 6;

x is 0 or 1;

y is 0 or 1; and z is 0 or 1.

22. The hydrogel of claim 13 wherein said urethane-containing prepolymer is represented by formula:

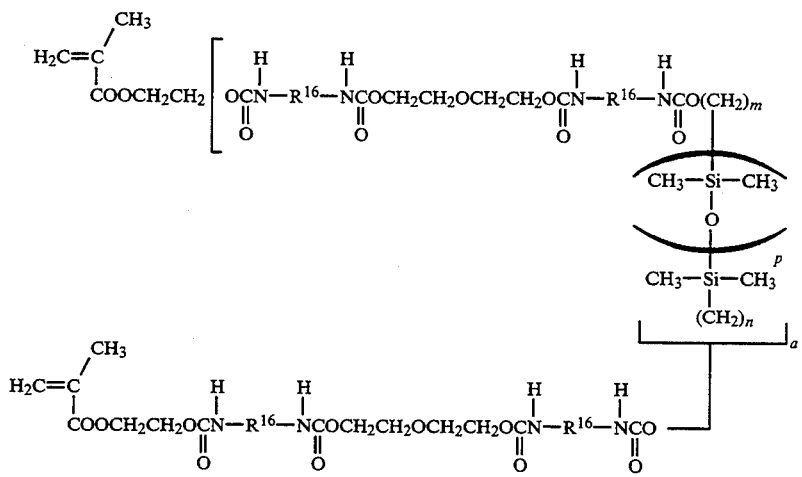

wherein:

R[16] is a diradical of a diisocyanate after removal of the isocyanate group and m, p and a are the same as previously defined.

23. The hydrogel of claim 13 wherein said silicone-containing monomer is α, ω-bis(methacryloxybutyl) polysiloxane.

24. The hydrogel of claim 13 wherein said silicone-containing monomer is α, ω-bis(methacryloxybutyl) polysiloxane, said acid-containing monomer is methacrylic acid, and said amine-containing monomer is 3-(N,N-dimethylamino)propylmethacrylamide.

25. The hydrogel of claim 13 wherein said silicone-containing monomer is α, ω-bis(methacryloxybutyl) polysiloxane, said acid-containing monomer is 2-acrylamido-2-methylpropanesulfonic acid, and said amine-containing monomer is 3-(N,N-dimethylamino)-propylmethacrylamide.

26. The hydrogel of claim 13 wherein said silicone-containing monomer is α, ω-bis(methacryloxybutyl) polysiloxane, said acid-containing monomer is acrylic acid, and said amine-containing monomer is 3-(N,N-dimethyl amino)propylmethacryl amide.

27. The hydrogel of claim 13 wherein said silicone-containing monomer is a urethane-containing prepolymer, said acid-containing monomer is 2-acrylamido-2-methylpropanesulfonic acid and said amine-containing monomer is 3-(N,N-dimethylamino)propyl methacrylamide.

28. The hydrogel of claim 13 wherein said silicone-containing monomer is a urethane-containing prepolymer, said acid-containing monomer is acrylic acid, and said amine-containing monomer is 3-(N,N-dimethylamino)propyl methacrylamide.

29. A biomedical device made from the hydrogel composition of claim 13.

30. A contact lens made from the hydrogel composition of claim 13.

* * * * *

UNITED STATES PATENT AND TRADEMARK OFFICE
CERTIFICATE OF CORRECTION

PATENT NO. : 5,451,617
DATED : September 19, 1995
INVENTOR(S) : Yu-Chin Lai and Paul L. Valint, Jr.

It is certified that error appears in the above-indentified patent and that said Letters Patent is hereby corrected as shown below:

On the title page, item [75]:

Inventors: Change "Yu-Chan Lai" to -- Yu-Chin Lai --.
Change "Paul J. Valint, Jr." to -- Paul L. Valint, Jr. --.

In column 2, line 64, change "dior" to -- di- or --.

In column 5, line 18, change "HC" to -- $H_2C$ --.

In column 13, line 5, change "D,G)ₐ" to -- $D*G)_a$ --.

In column 13, line 7, change "D*E''" to -- $D*E'$ --.

In column 13, line 50, change "R'" to -- $R^r$ --.

UNITED STATES PATENT AND TRADEMARK OFFICE
CERTIFICATE OF CORRECTION

PATENT NO. : 5,451,617
DATED : September 19, 1995
INVENTOR(S) : Yu-Chin Lai and Paul L. Valint, Jr.

It is certified that error appears in the above-indentified patent and that said Letters Patent is hereby corrected as shown below:

In column 14, line 48, change "weltability" to -- wettability -- .

In column 14, line 60, change "prepolymer" to -- monomer -- .

In column 15, line 8, change "prepolymer" to -- monomer -- .

In column 15, line 63, change "acetate" to -- acrylate -- .

In column 15, line 67, change "prepolymer" to -- monomer -- .

In column 15, line 67 and column 16, line 1, change "prepolymer" to -- monomer -- .

Signed and Sealed this

Ninth Day of April, 1996

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,451,617
DATED : September 19, 1995
INVENTOR(S) : Yu-Chin Lai and Paul L. Valint, Jr.

It is certified that error appears in the above-indentified patent and that said Letters Patent is hereby corrected as shown below:

In column 15, line 31, change "method" to -- hydrogel -- .

In column 16, line 66 change "claim 13" to -- claim 21 -- .

Signed and Sealed this

Eleventh Day of June, 1996

Attest:

BRUCE LEHMAN

Attesting Officer    Commissioner of Patents and Trademarks